(12) United States Patent
Smith et al.

(10) Patent No.: US 7,966,373 B1
(45) Date of Patent: *Jun. 21, 2011

(54) AUTOMATED SYSTEM AND METHOD FOR DELIVERY OF MESSAGES AND PROCESSING OF MESSAGE RESPONSES

(75) Inventors: Charles M. Smith, Franklin, TN (US); Harold D. St. Clair, Nashville, TN (US)

(73) Assignee: Dialogic Communications Corporation, Franklin, TN (US)

( * ) Notice: Subject to any disclaimer, the term of this patent is extended or adjusted under 35 U.S.C. 154(b) by 602 days.

This patent is subject to a terminal disclaimer.

(21) Appl. No.: 10/155,836

(22) Filed: May 24, 2002

Related U.S. Application Data

(63) Continuation-in-part of application No. 09/241,807, filed on Feb. 2, 1999, now Pat. No. 6,463,462.

(51) Int. Cl.
*G06F 15/16* (2006.01)
(52) U.S. Cl. ......... 709/206; 709/201; 709/203; 709/246
(58) Field of Classification Search .............. 378/88.13; 395/200.04; 709/201, 206, 203, 246
See application file for complete search history.

(56) References Cited

U.S. PATENT DOCUMENTS

| | | | |
|---|---|---|---|
| 4,340,973 A | 7/1982 | Umetsu | |
| 4,371,751 A | 2/1983 | Hilligoss, Jr. et al. | |
| 4,392,248 A | 7/1983 | Eckels et al. | |
| 4,551,855 A | 11/1985 | Kurosaki et al. | |
| 4,633,515 A | 12/1986 | Uber et al. | |
| 4,791,658 A | 12/1988 | Simon et al. | |
| 4,922,514 A | 5/1990 | Bergeron et al. | |
| 5,268,928 A | 12/1993 | Herh et al. | |
| 5,327,478 A | 7/1994 | Lebowitz | |
| 5,329,578 A * | 7/1994 | Brennan et al. | 379/211.03 |
| 5,454,024 A | 9/1995 | Lebowitz | |
| 5,633,916 A | 5/1997 | Goldhagen et al. | |
| 5,737,395 A | 4/1998 | Irribarren | |
| 5,794,039 A | 8/1998 | Guck | |
| 5,835,712 A * | 11/1998 | DuFresne | 709/203 |
| 5,930,471 A * | 7/1999 | Milewski et al. | 709/204 |
| 5,956,693 A * | 9/1999 | Geerlings | 705/14 |
| 6,031,895 A * | 2/2000 | Cohn et al. | 379/88.13 |
| 7,523,222 B2 * | 4/2009 | Carlson et al. | 709/246 |

* cited by examiner

*Primary Examiner* — Philip C Lee
(74) *Attorney, Agent, or Firm* — Knobbe Martens Olson & Bear LLP

(57) ABSTRACT

An automated system for delivery of messages to multiple recipients, and for processing of responses to the messages, includes a message client, message server, and system database. A message is created using a universal message form. The message content can be translated into multiple formats and sent to one or more different recipients using one or more different types of messaging devices, including pagers, telephones, fax machines, and e-mail readers. A recipient profile manager allows each recipient to select the messaging devices to be used for message delivery as well as preferred messaging schedules, priorities, and message security. Receipt of the messages by the recipients is verified, response requirements collected and consolidated from multiple sources and presented to the message originator in a structured format.

9 Claims, 18 Drawing Sheets

Reciprix Messenger Client Authoring Component

Figure 2 – Reciprix Messenger Client Authoring Component

Figure 4   Profile Manager
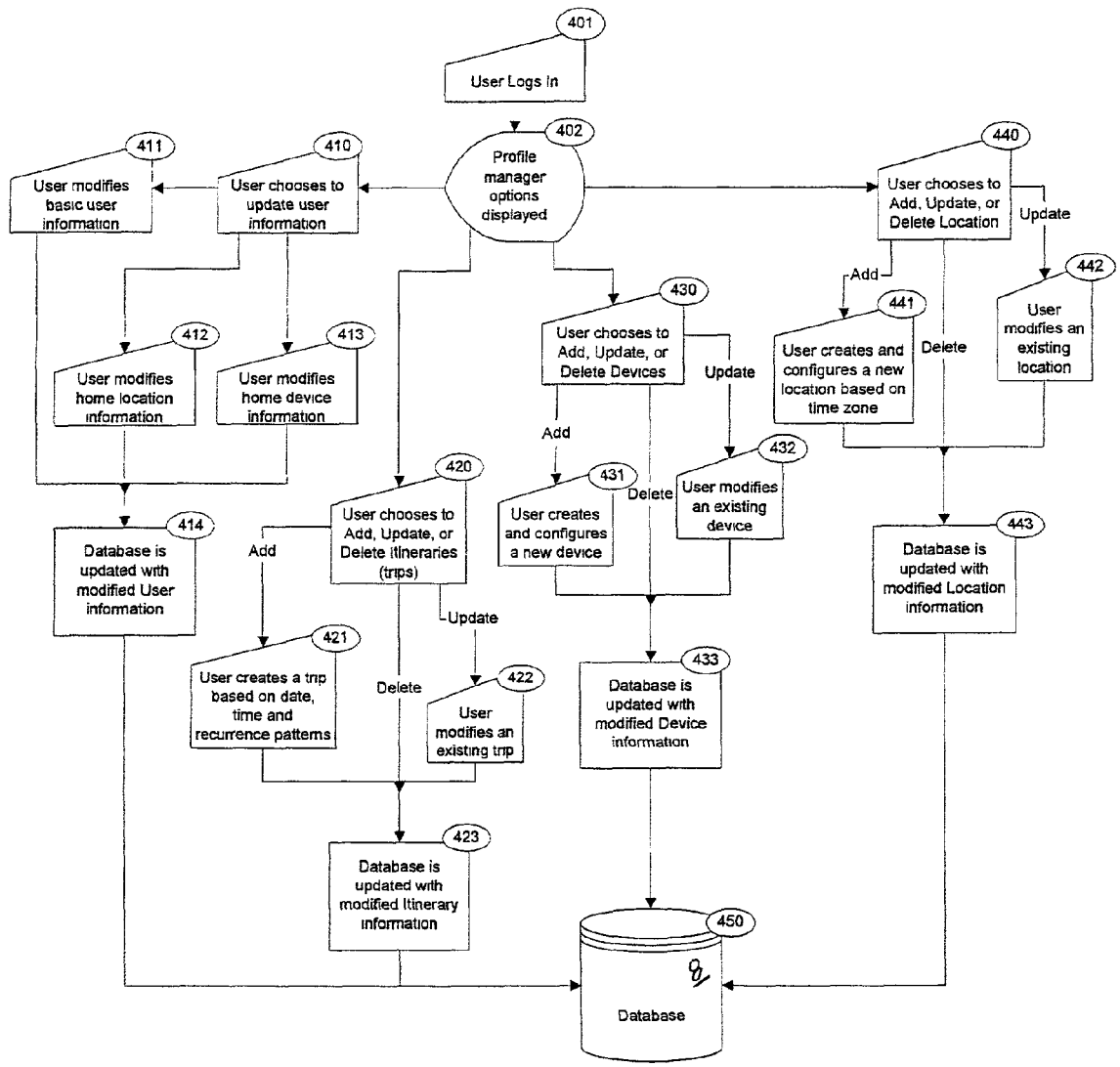

Figure 5

| | A | B | C | D | E | F | G | H |
|---|---|---|---|---|---|---|---|---|
| | ResponseDateTime | DisplayName | Number of class seats to reserve. | Number of class seats to reserve. | Number of class seats to reserve: | Number of class seats to reserve: | Please have a training coordinator call me. | Phone # |
| 1 | 4/26/2002 10:50:50 AM | Bill McDonald | 0 | 0 | 12 | | 0 Yes | 900-joe-cool |
| 2 | 4/26/2002 10:49:38 AM | David Haney | 2 | 5 | 3 | | 4 Yes | (615) 550-0 |
| 3 | | Jim Johnson | | | | | | |
| 4 | | Josh Whitmer | | | | | | |
| 5 | 4/26/2002 10:57:18 AM | newton.hudson@reciprix.com | 1 | 3 | 0 | | 2 Yes | 615-555-678 |
| 6 | | peter.gregory@dccusa.com | | | | | | |
| 7 | 4/26/2002 10:52:55 AM | stallyn | 1 | 0 | 0 | | 1 Yes | 615-555-555 |
| 8 | 4/26/2002 10:55:19 AM | todd.buttray@reciprix.com | 4 | 0 | 0 | | 0 Yes | 550-0205 |

Figure 6      Response Monitor
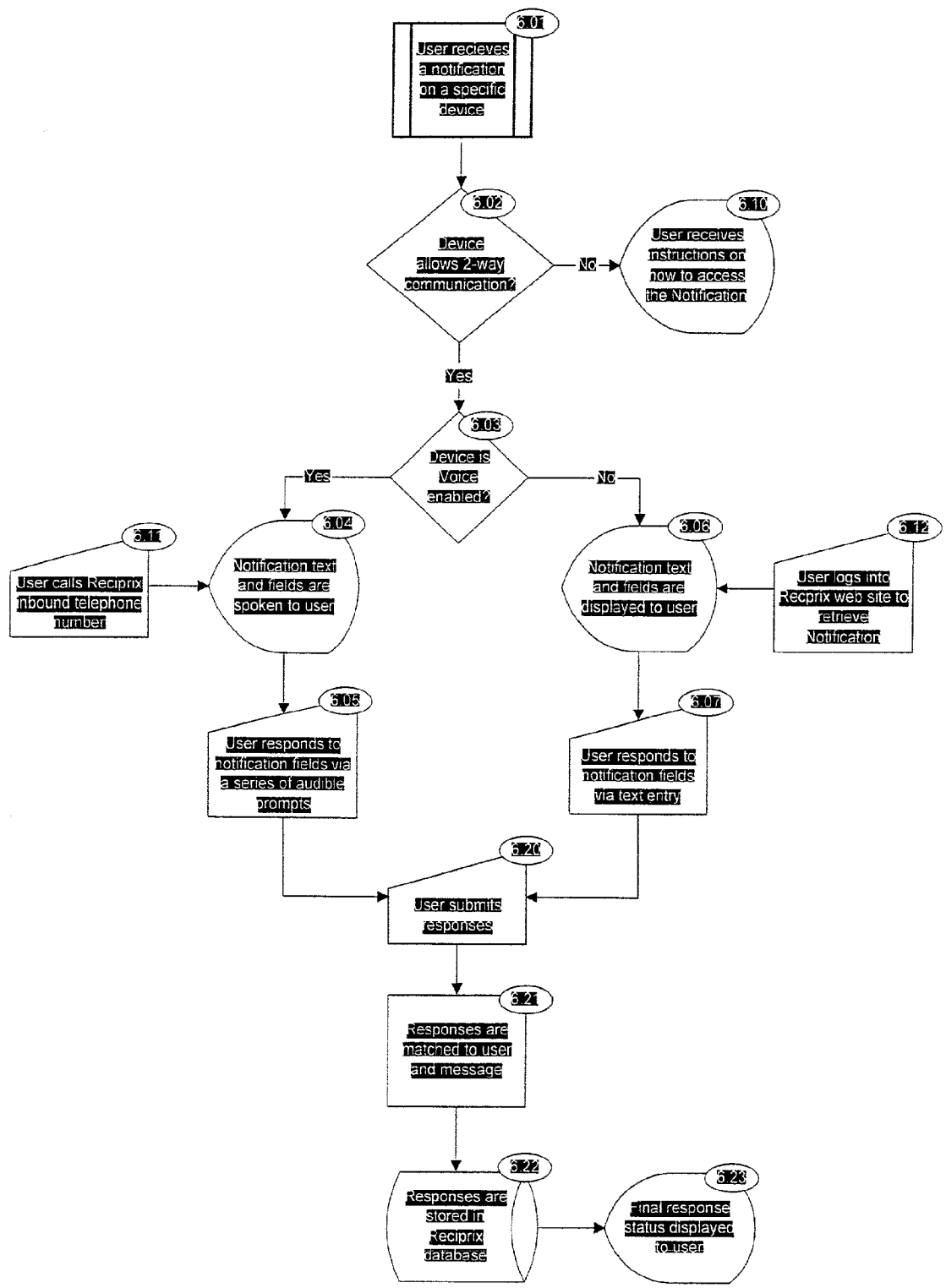

Figure 7  Response Viewer
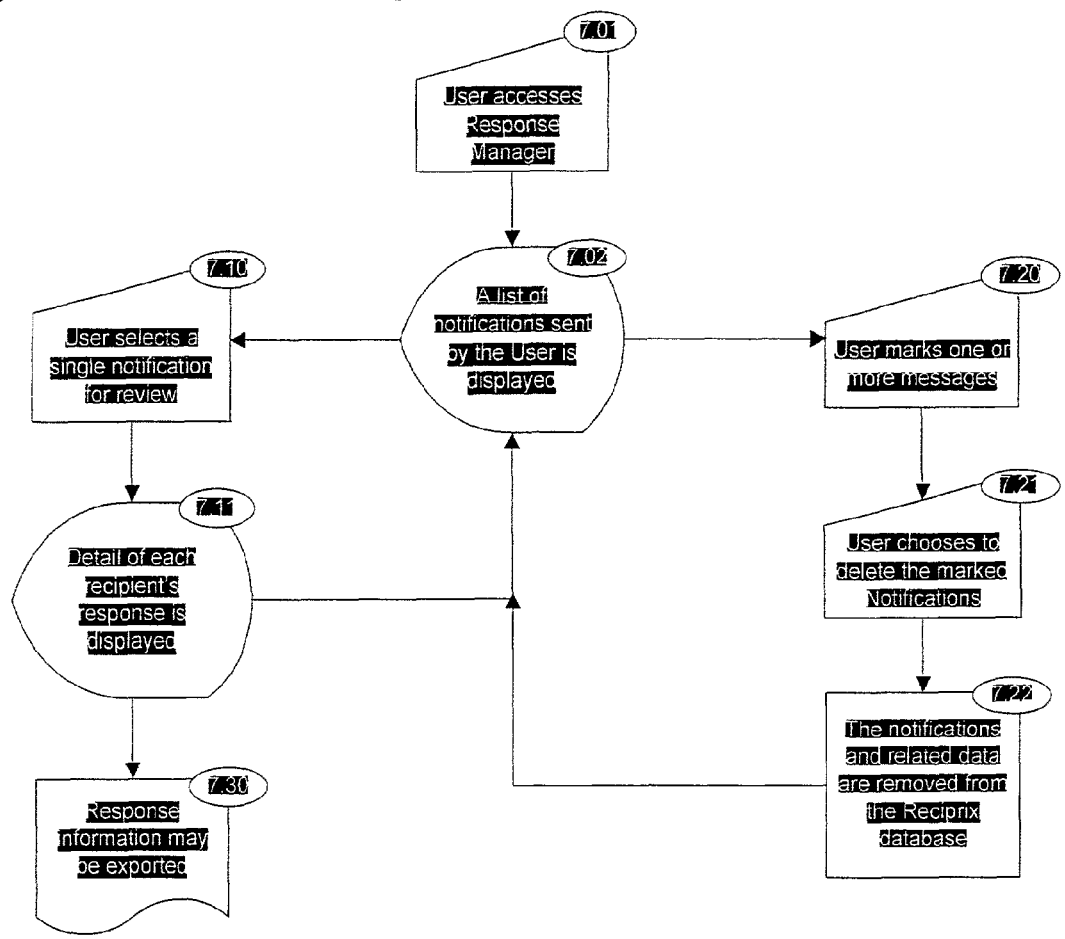

Figure 8 – Database Design
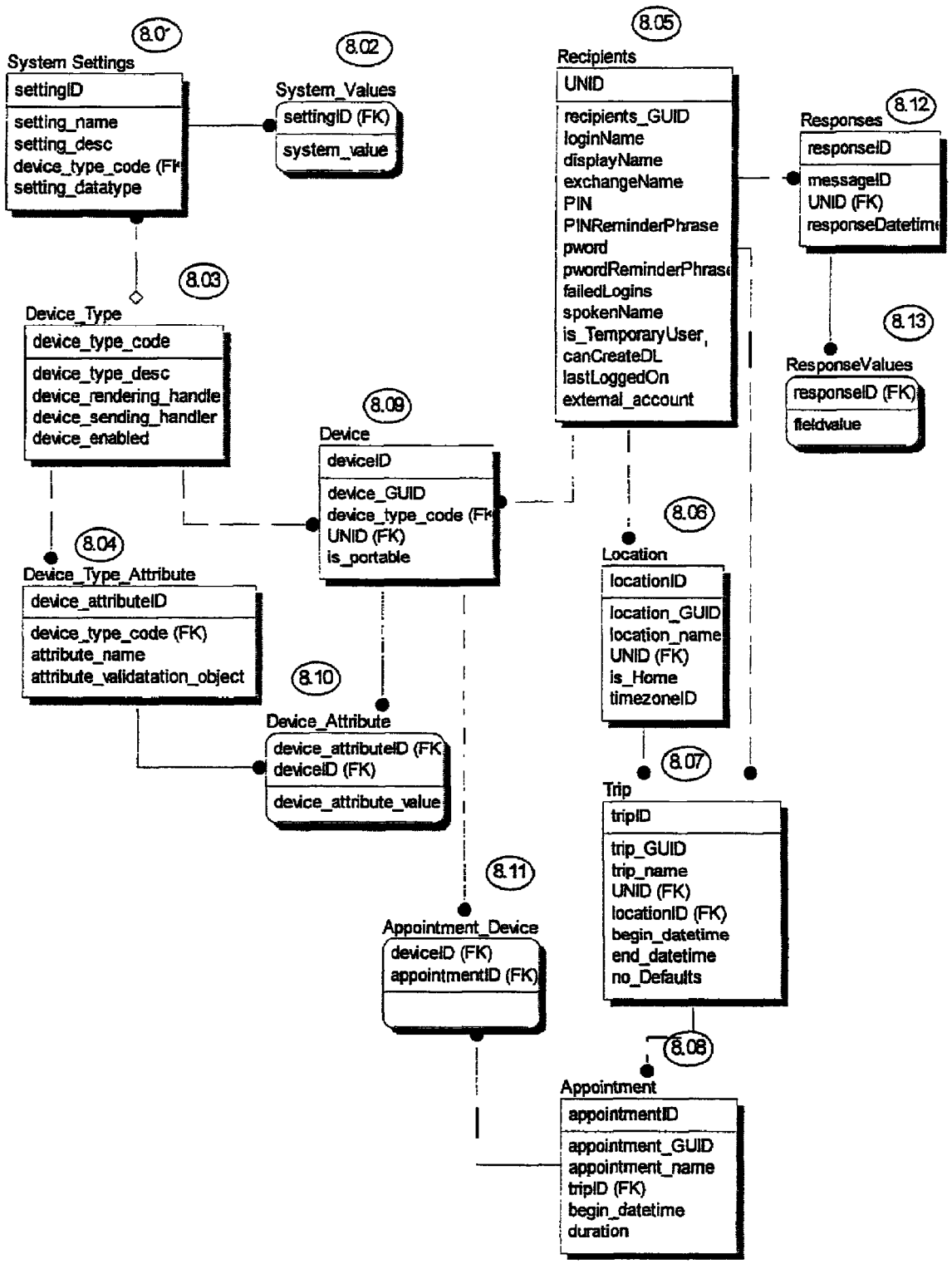

Figure 9          System Design
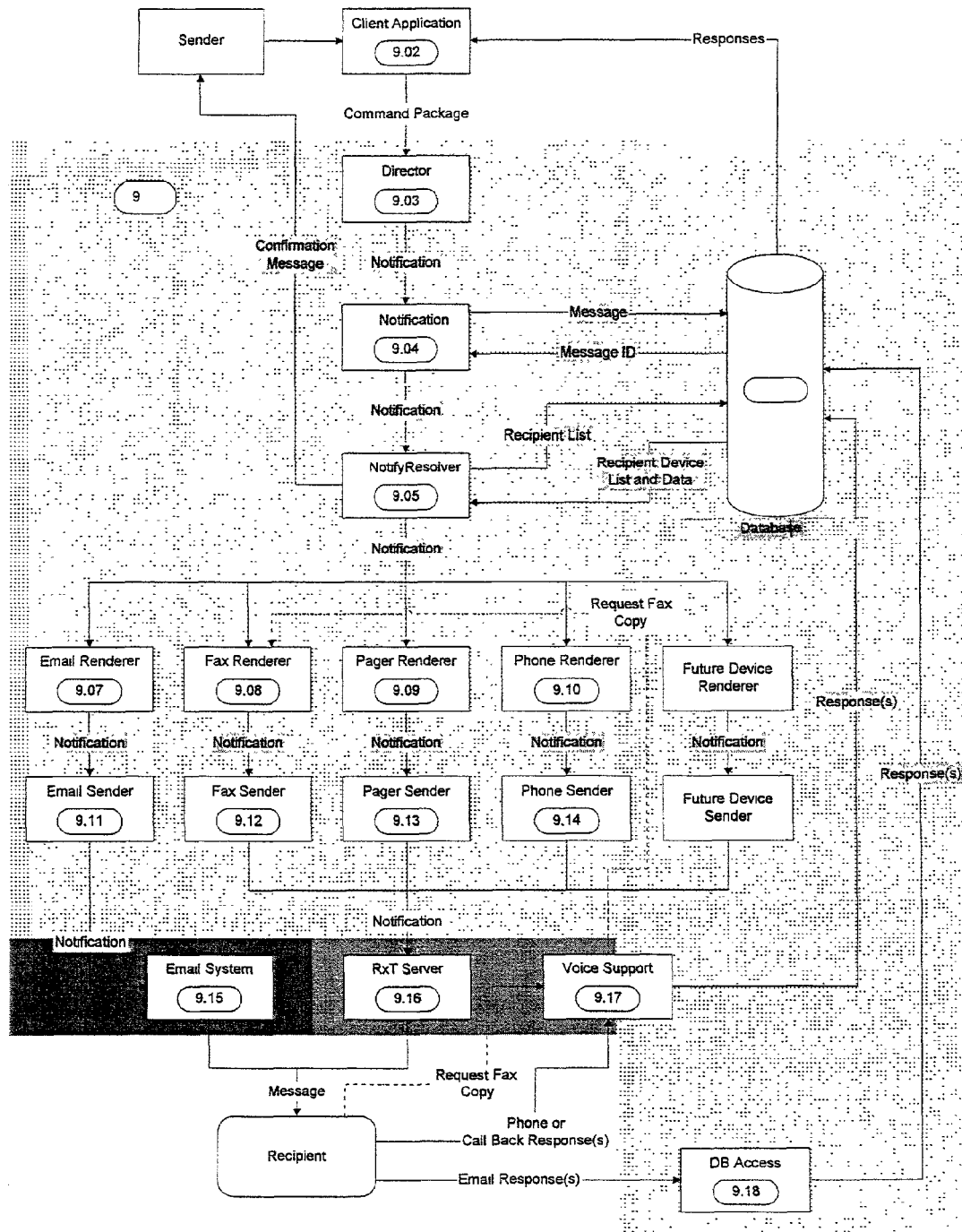

Figure 10          Messenger DLL
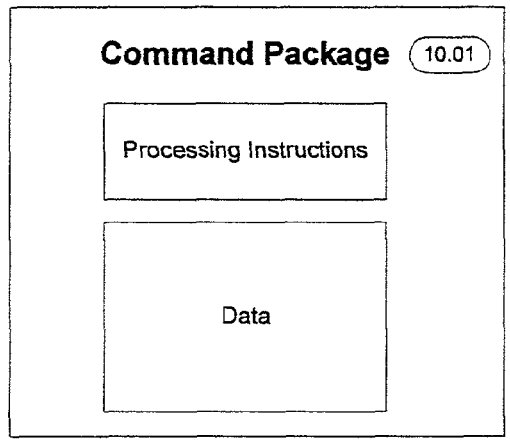
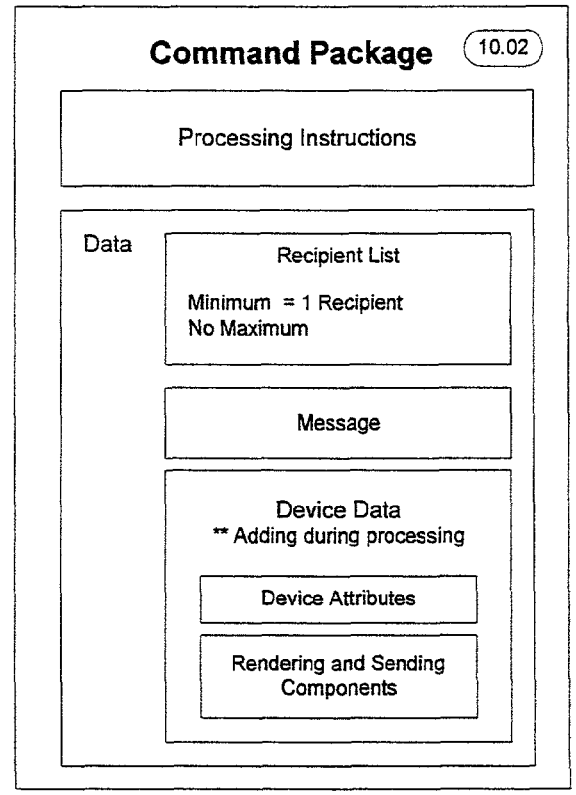

Figure 13 – Reciprix Appointment Wizard

Figure 14 – Reciprix Profile Manager

Figure 15 – User Response workflow

Figure 16 – User response via Web

Figure 18 – Response Viewer

AUTOMATED SYSTEM AND METHOD FOR DELIVERY OF MESSAGES AND PROCESSING OF MESSAGE RESPONSES

This application is a continuation-in-part of U.S. patent application Ser. No. 09/241,807 (now U.S. Pat. No. 6,463, 462), filed Feb. 2, 1999, entitled "Automated System and Method for Delivery of Messages and Processing of Message Responses." The contents of the above-referenced application are hereby incorporated by reference in their entirety.

A portion of the disclosure of this patent document contains material that is subject to copyright protection. The copyright owner has no objection to the facsimile reproduction by anyone of the patent document or the patent disclosure, as it appears in the Patent and Trademark office patent file or records, but otherwise reserves all copyright rights whatsoever.

Be it known that we, Charles M. Smith, a citizen of United States, residing at 245 Pebble Glen Drive, Franklin, Tenn. 37064, and Harold D. St. Clair, a citizen of United States, residing at 620 Barlin Drive, Nashville, Tenn. 37221 have invented a new and useful "Automated System and Method for Delivery of Messages and Processing of Message Responses."

BACKGROUND OF THE INVENTION

The present invention relates generally to the creation and delivery of messages, and the routing, verification and collection of responses to the messages, using systems and methods that are universally applicable to, and independent of, the type of messaging system and device selected by the message recipients. More particularly, the present invention relates to automating and escalating delivery of messages and collection of message responses, implemented through multiple messaging devices in conjunction with recipient profiles, verification of messages and responses, and collection of responses in a predefined format.

Businesses and their employees are actively involved in sending and receiving information using a variety of messaging formats, systems, and message receiving devices. For example, a traveling employee might, in a single trip away from the office, receive messages sent by fax, pager, electronic mail (e-mail), and voice mail. In addition, the messaging devices by which these messages are actually received might include a pager, a cellular telephone, a paper fax machine, a voice mailbox, or a portable computer connected to the Internet or to a private local area network (LAN). Often these messages will vary in their level of importance. This could affect the delivery methods and/or the nature and timing of any needed response to the message. For example, the arrival of an e-mail message from a particular sender might cause the recipient to fax a report in response. A message reporting a failure in a mission-critical computer system may need an immediate response from a maintenance technician that the message has been received and will be acted on. A message reporting a fire or other disaster may need to be sent simultaneously, or in a message hierarchy, to multiple members of a disaster response team, with escalating methods of messaging and response gathering to insure that every team member has been notified and has responded in an appropriate fashion. In some group messaging contexts, the post-message processing, organizing, and reporting of multiple message responses can be important in further decision making by the message originator.

Commercially available e-mail systems provide users with a method of creating and delivering digital messages to other e-mail addresses. Attachments of files may also be included with the e-mail message for recipient review. The address selections are sender defined and require entry and updating by the party responsible for initiating the message. Recipients may respond back to the sender's e-mail address, at which point the sender has confirmation that their message was acted upon.

Commercially available unified messaging systems generally replace older communications technology with integrated voice and messaging systems for receipt of communications. Receipt of voice messages in a unified messaging system includes wave file recordings that are accessed by the recipient from an e-mail format.

Other media specific device systems address e-mail to pager, pager to e-mail, e-mail to fax, and e-mail to voice, but do this separately. In a typical conventional system of this type, e-mail messages are created, addressed to specific devices, and sent to those devices using the device-specific translation programs required. Commercially available servers route messages to recipients chosen by the sender for specific types of messaging devices through public-switched telephone networks (PSTN), over the Internet, and at non-peak periods through PSTN using least cost routing methods.

The prior art methods implemented in commercially available unified messaging and device specific systems generally provide one-way delivery, with destinations defined by the sender. Unfortunately, prior art systems do not solve the need for originating a message, with attachment and response requirements, in a manner and format that is independent of the type of the device that is to be used for delivering the message to the recipients. Also, prior art systems do not permit the message delivery methods to be defined by the recipients, and do not include a facility for automatic processing and organization of message responses. Accordingly, the e-mail, unified messaging and specific device systems using these prior art methods are deficient in responding to these requirements.

What is needed, then, is a system and method for automating and escalating the delivery of messages and collection of message responses, implemented through messaging devices of multiple types, in conjunction with recipient rules routing, verification of message delivery and response, and collection of responses in a predefined format.

SUMMARY OF THE INVENTION

One object of the present invention is to create messages using a universal format that is independent of the type of messaging devices used for delivering the messages, with attachments and response requirements, to multiple e-mail, voicemail, fax, pager and telephone communications devices. The communications can be initiated by a sender, or automatically created as a digital message based on escalating trigger events.

Another object of the present invention is to provide a message processing system and method that defines and is adapted for use with multiple types of messaging devices and that delivers messages based on time of receipt, priority of information delivered, and security of the communications device.

Yet another object of the invention is to allow the use of recipient rules routing profiles that are maintained by each recipient on the system and that can be modified by the recipient at any time.

A further object of the present invention is to verify message responses from the recipients, collect and consolidate response requirements from multiple messaging sources, and present the information to the message originator in a structured format.

These and other objects are achieved in an automated system and method for delivery of messages and processing of message responses through the automation of: (1) processing messages and associated information for simultaneous delivery to existing multiple type of messaging devices; (2) routing messages and associated information based on recipient profile rules for receiving the message; and (3) response, verification, collection and consolidation of response requirements.

BRIEF DESCRIPTION OF THE DRAWINGS

FIG. 4 is a flow chart of the software routines implemented in the Profile Manager module for developing and maintaining recipient profiles according to the present invention.

FIG. 5 is a graphic display of a spreadsheet generated by the system of the invention and listing the recipients of the sample message shown in FIG. 3 and the responses to the questions or response fields included in the message.

FIG. 6 is a block diagram overview of the flow of message information in the Response Monitor module for processing and routing responses from recipient messaging devices to the System Database and Response Viewer.

FIG. 7 is a flow chart of the software routines implemented in the Response Viewer module for viewing of message information and collection of response information.

FIG. 8 illustrates the organization of data dictionary tables and data fields in the System Database used for processing messages and storing recipient profile and response field data.

FIG. 9 is a block diagram representation of the system of FIGS. 1-8, as implemented in a Microsoft Windows Server computing platform.

FIG. 10 is block diagram and flow chart showing the functionality of the Messenger dynamic linking library (DLL) module used in the system of FIG. 9.

FIG. 18 is a screen shot graphic display of a group of organized responses to the sample message shown in FIG. 3, viewed in a message folder view using the Response Viewer module, as implemented in the system of FIG. 9.

DETAILED DESCRIPTION OF THE PREFERRED EMBODIMENTS

System Overview

Figure 1:
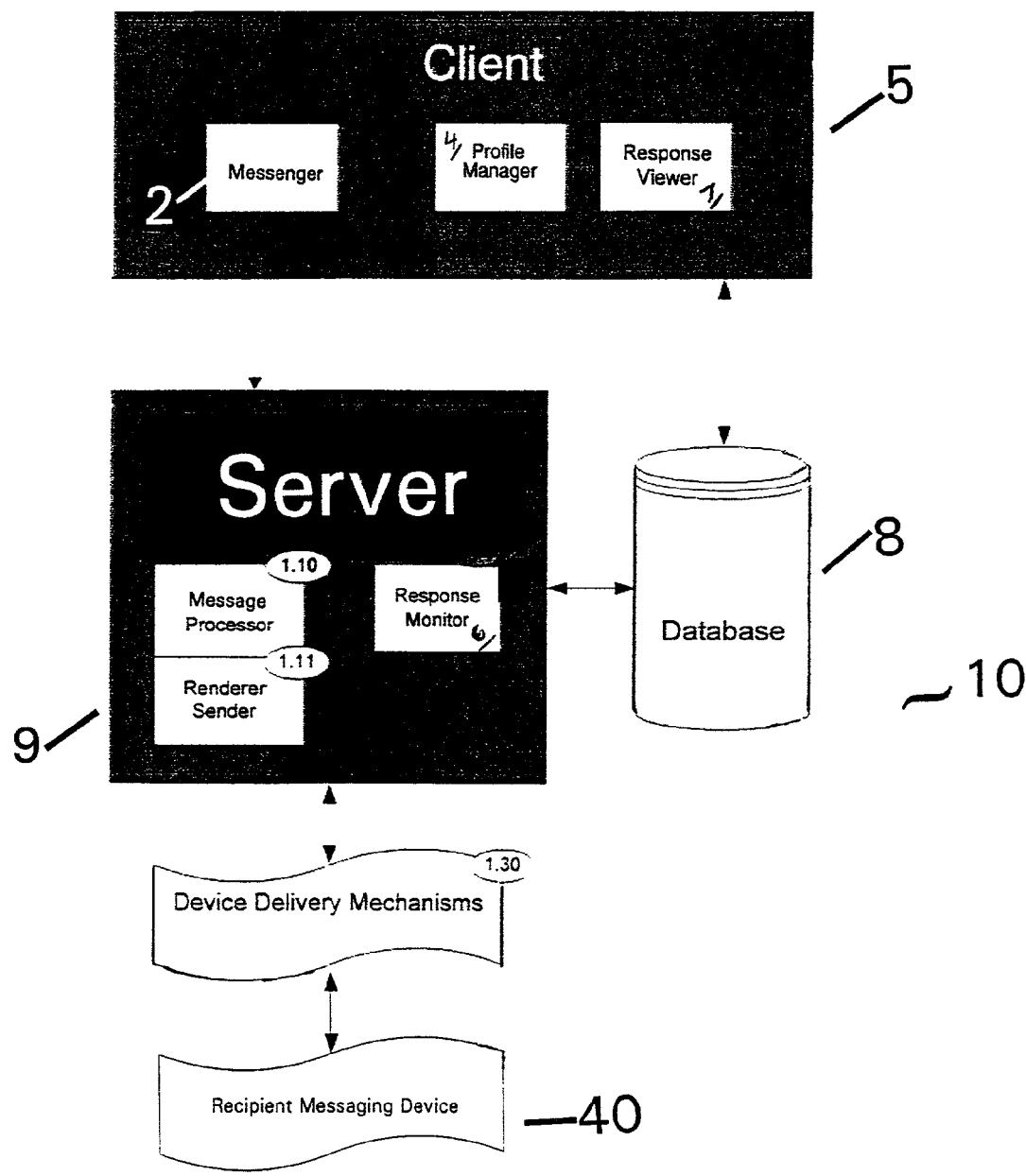
FIG. 1 is a block diagram representation of one embodiment of the system of the present invention depicting flow of message and communications information between and among the System Client, System Server, System Database, Device Delivery Mechanisms, and Recipient Messaging Devices.

Referring to FIG. 1, the message and messaging system 10 of the present invention generally includes a System Client 5, System Server 9, and System Database 8, each operatively linked to each other and to one or more Recipient Messaging Devices 40 through Messaging Device Delivery Mechanisms 1.30. Preferably, the System Client 5 combines a conventional computer system with three software modules: a Messenger 2 for initiating messages (sometimes referred to as a "notification") to message recipients; a Profile Manager 4 for maintaining recipient profile information; and a Response Viewer 7 for viewing message response information received from message recipients.

The System Server 9 also combines a conventional computer system with software modules that include a Message Processor (1.10) for processing and routing messages to recipients; one or more Renderer/Sender modules (1.11) for managing the communications links to one or more types of Device Delivery Mechanisms (1.30) and Messaging Devices 40; and a Response Monitor 6 that accepts response information received back from message recipients. The Server 9 can be implemented in a single server or across a distributed group of servers, and/or in a processing pipeline for sending system messages.

The System Database 8 can be a conventional mass storage device combined with or linked to a processor and database engine for maintaining required recipient information, configurable system settings, and response information.

Figure 2:
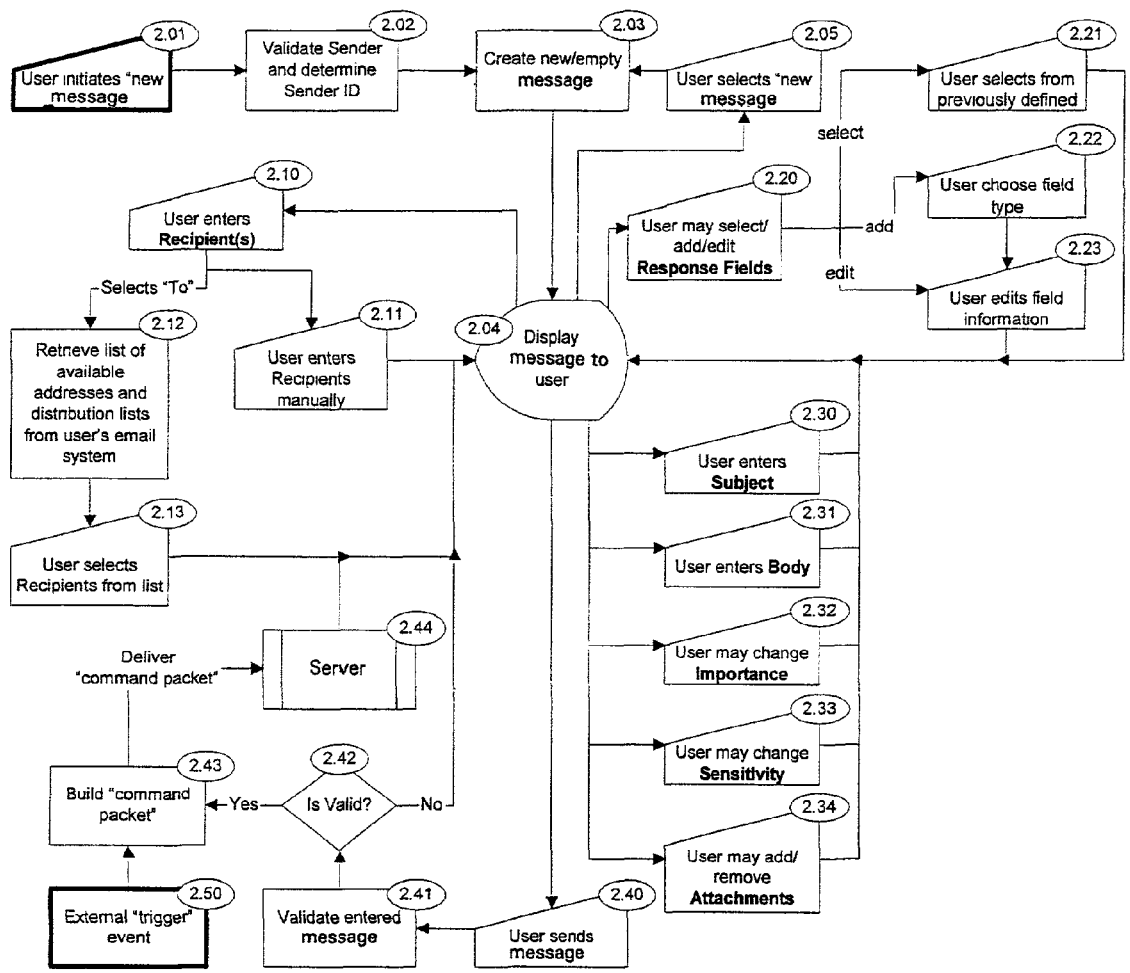
FIG. 2 is a flow chart illustrating the functionality of the software routines implemented in the Messenger module, for the initiation of manual and triggered messages according to the system of present invention.

Generally, the flow of device independent messages is initiated in digital format, either manually by Messenger 2 (FIG. 2, block 2.01) or triggered automatically by some external event (FIG. 2, block 2.50). Recipients are selected, the message body and response fields are entered, and attachments are selected. The Profile Manager 4 provides each recipient with tools to define their preferred method, time, priority and security of message delivery, and stores this information in a recipient profile in the System Database 8.

The Message Processor (1.10) in the Server 9 (director 9.03, notification 9.04, and Notify Resolver 9.05 in FIG. 9) links the message with the message sender, stores the message in the Database 8, and determines what devices for each recipient will be used to deliver the message. The Renderer/Sender (1.11) (Renderers 9.07-9.10 and Senders 9.11-9.14 in FIG. 9) convert the message received from the Message Processor (1.10) into the proper format for delivery to, and response by, a recipient. The format used by the Renderer/Sender 1.11 corresponds to the messaging device(s) specified by the recipients and stored in their respective profiles. These messaging devices and communications formats include email, voice mail, fax, pager, telephone and wireless messaging devices. The Renderer/Sender 1.11 architecture is designed to allow for future devices to be supported as well. Since communications devices and protocols are constantly evolving, the Render/Sender 1.11 design allows new devices and protocols to be "plugged" into the system as the technology becomes available. The same message information can be simultaneously delivered to recipients over the Internet and via Public Switched Telephone Networks (PSTN) through various third-party telecommunications gateways.

After the recipients have received the message and initiated a response, the response data is returned via the Response Monitor 6. The Response Monitor 6 links the response data to the appropriate message and stores the data in the Database 8.

The Response Viewer 7 has access to all returned message information, and provides status of responses and consolidation of recipient response data.

Accordingly, the system of this invention improves business productivity by extending messaging to all forms of business communications, providing effective message delivery, immediate verification of message receipt, and pro-active closure. The system delivers messages through any conventional messaging device and provides responses quickly back to the message sender in a controlled and defined format. Thus, the system closes the loop on messaging communications.

Preferably, the system software will include an Applications Program Interface module that allows other programs to: access user profile data; initiate messages; to access message response information; and to update message response information.

Messenger

Figure 3:
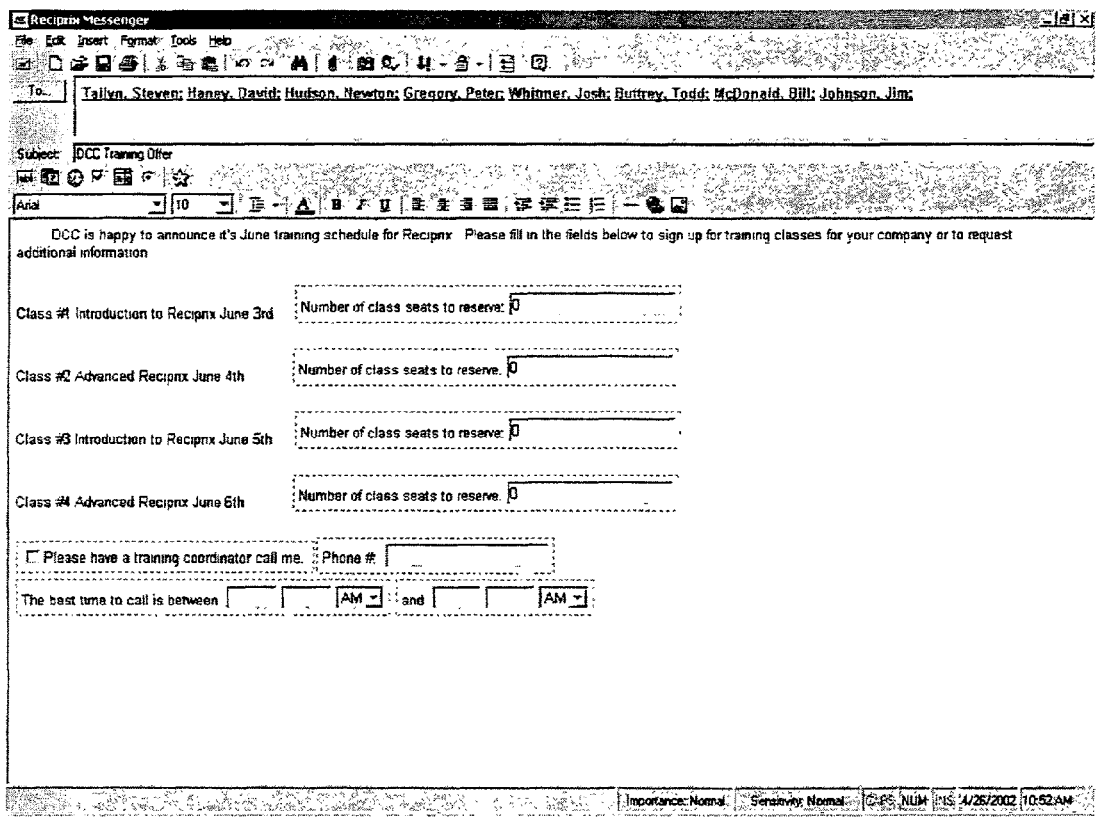
FIG. 3 is a graphic display of a sample universal message form used with the system of the invention, further showing response fields added to the form by the message sender using the Messenger module.

The Messenger module 2 is the client message-authoring tool. FIG. 2 is a flow chart describing the general functioning of the Messenger 2 necessary for a user (message sender) to initiate a message. The user/sender begins by initiating a new message (2.01). An empty message form is created (2.03) and displayed to the user (2.04). From there the user can begin entry of the message. The user must specify the recipients either manually (2.10, 2.11) or by taking advantage of a recipient list made available from the user's installed email client (2.10, 2.12, 2.13). The user may modify the importance (2.32) and sensitivity (2.33) levels for the message. The user must enter the subject (2.30) and the message body (2.31), and may add and remove attachments (2.34) to the message. Response fields, which are structured entities placed for the purpose of gathering information from recipients, can be added to the message (2.20) by either selecting from a list of previously defined fields (2.21) or by creating a new field on the fly (2.22). Also, the user may edit (2.23) previously placed fields. The resulting message form may look like that shown in FIG. 3. When ready, the user may send (2.40) the message, which validates the entered information (2.41), builds the necessary command package (2.43), and delivers the command package to a message director component (2.44) in the Server 9, shown as block 9.03 on FIG. 9.

The design of a command package that is generated by the messenger 2 and delivered to the message processor 1.10 is shown in FIG. 10. Block 10.01 shows that the command package generally includes both processing instructions and data. Block 10.02 represents a command package based on a typical message that will include processing instructions and, in the data block, a recipient list, the message itself, and message device data corresponding to the device selected for delivery by the identified recipient(s), including device attributes and identification of the proper rendering and sending components.

Triggered messages (2.50), received by external applications and monitors, also create the necessary command package (2.43) and deliver it to a message director component (2.44) in the Server 9.

Thus, the messenger 2 provides the ability to send a message to multiple recipients and to personalize the message by inserting data, formatting, and scripting that is unique to each individual recipient and to deliver the resulting message across the various communications media.

System Server

One embodiment of the Server 9 is shown in FIG. 9. The Server 9 is a combination of software modules for processing and routing messages to a specified email system (9.15) and to an RxT Server (9.16). The RxT Server 9.16 is a combination of software components that manage the submission of outbound "calls" to various third-party telecommunication gateways. A command package (such as that shown in FIG. 10) consists of specified processing instructions and data. In the case of messages (2.02), the data consists of the message content (with or without attachments) and the identity of the intended recipients.

FIG. 9 provides an overview of the processing flow of information through the Server 9. The process of submitting a message to the Server 9 for processing and delivery begins with the message sender utilizing a client application (block 9.02 on FIG. 9). The client application 9.02 (either the Messenger 2 (FIGS. 1 and 2) or a custom application designed using the system Applications Programming Interface) creates messages, inserts them into command packages, and submits them to the Director component (9.03) of the Message Processor 1.10 (FIG. 1). The Director component 9.03 acts as a traffic manager for the Server 9. It examines the processing instructions of each command package, extracts the data into a data package, and routes its data to the appropriate processing component. For messages, the data package (message) is passed to the Notification component (9.04).

The Notification component 9.04 extracts the sender information and the message from the message and stores them in the System Database 8. The message is tagged with a Message ID number that is inserted into the message. The message is then passed to the Notify Resolver component (9.05).

The Notify Resolver 9.05 extracts the recipient list from the message and passes it to the Database 8. The Database 8 resolves the recipients with their devices based upon the current time and the recipient's profiled location and schedule. Only devices set to be available at the current time for the recipient's current location are selected. (For explanation of the relationship between a recipient's location and devices, please refer to the description of the Recipient Profile module.) A message can be sent to any or all device types. If a recipient is not present in the database, a profile is created for them. The device data is returned to the Notify Resolver component 9.05 and is incorporated into the message. Device data consists of all attributes necessary for submitting a message to the email system or the RxT Server component 9.16. It also contains the identification of the rendering and sending components that are to be used to process the message for the particular device. The message is then passed to the renderer components (9.07-9.10) specified in the device data. A confirmation message is then sent to the message sender (generally through email) indicating that the message has been sent. The message also contains a list of the number of devices that the message was sent to, itemized by device type.

Renderer/Sender

The Renderer/Sender module 1.11 (FIG. 1) includes both message rendering components and sending components, as shown on FIG. 9. The renderer components are comprised of the Email Renderer (9.07), Fax Renderer (9.08), Pager Renderer (9.09) and Voice Renderer (9.10). Each renderer component (9.07-9.10) has a corresponding sender component (9.11-9.14) that receives the message after the rendering processing is complete. The renderer component extracts the message body from the message and converts or translates it into a format compatible with the specified messaging device 40.

Rendering is based upon message sensitivity and device security. Messages that have high sensitivity or that are being sent through un-secure devices are replaced with instructions indicating to the user how he/she is to retrieve the message. These instructions generally include a Web URL or a "callback" phone number. Messages that have normal sensitivity or that are being sent to secure devices are rendered intact.

Message attachments are either incorporated into the rendered message or provided as attachments (i.e., email). Portions of the message text are substituted with text compatible with the appropriate device. An example of this is the expansion of acronyms for voice messages.

The rendered message is either stored in the message or persisted to disk with the file path being stored in the message. The message is then passed to the renderer component's corresponding sender component specified in the device data. Support for future devices is accomplished by the incorporation of a new device-appropriate rendering component that would convert the message to the proper device format based on device data attributes stored in the Reciprix database.

The sender components are comprised of the Email Sender (9.11), Fax Sender (9.12), Pager Sender (9.13), and Phone Sender (9.14). The sender component extracts the device list and rendered message from the message. The Email Sender 9.11 builds an email message for each device email address and posts each to the appropriate mail server. The Fax Sender 9.12 submits each device fax number and the message (rendered TIF file) to the RxT Server 9.16 as a separate task. The Pager Sender 9.13 submits each device pager number and the rendered message (pager script) to the RxT Server 9.16 as a separate task. The Phone Sender 9.14 submits each phone number and the rendered message (way file) to the RxT Server 9.16 as a separate task. Support for future devices is accomplished by a system architecture that can incorporate future device-appropriate rendering and sending components that would submit the device-rendered message and device-specific attributes as a task to the RxT Server 9.16

Figure 17:
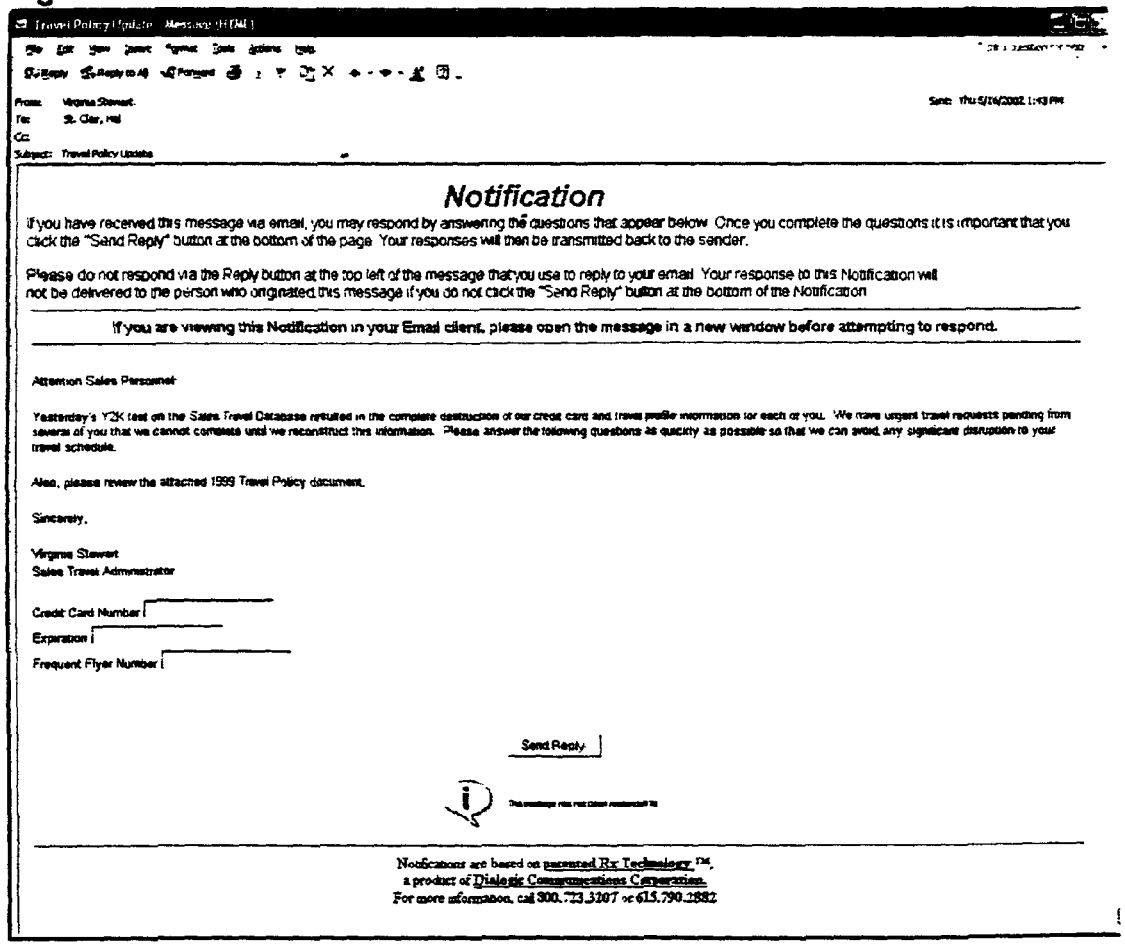
FIG. 17 is a screen shot graphic display of a response to a sample message viewed as an individual e-mail response message using the Response Viewer module, as implemented in the system of FIG. 9.

The email system 15 can be any email processing service and is used solely for the delivery of text and HTML or MHTML formatted messages (or other formats as they become available) created by the system's device rendering handler for email devices as determined by the Device_Type table (table 8.03 on FIG. 8) of the Database 8. All messages are delivered using standard interne protocols as supported by the email system selected. A sample message delivered to a recipient by email is shown in FIG. 17.

In the current embodiment, the Email Renderer 9.07 creates MHTML messages with instructions to post the information from the completed form back to an active server page (ASP) on Server 9. Each message contains hidden information that uniquely identifies the message and the specific recipient, enabling the server to distinguish which recipient has responded. The target ASP page utilizes the DB Access (9.18) component to persist the response information, including the message identifier and the recipient identity, to the System Database 8. The recipient can respond to the message infinitely and the system may be configured to record all additional responses or only the most recent one.

The RxT Server 9.16 processes each task by placing calls through the appropriate telecommunication gateway. Voice messages can be infinitely responded to by user interaction through the Voice Support component (9.17). The Voice Support component gathers user response information and persists it to the Database 8. The user is also presented with the option to request a faxed copy of the message. If the user chooses to receive a faxed copy, the Voice Support component 9.17 collects the fax number from the user and renders the message into a fax compatible format. The fax number and formatted message are placed into a message and submitted to the fax sender component. It is handled like any other fax message.

A recipient cannot respond to fax and pager messages interactively. This applies only to standard alpha and digital paging devices. Interactive paging devices are handled like voice devices. Generally, the fax or pager message will contain a statement informing the user how to respond. The response will be either a call back number or the URL of the appropriate system web site. The RxT Server 9.16 handles the call back process. The Voice Support component 9.17 gathers user response information and persists it to the System Database 8.

During the call back process, the user is presented with the option to request a faxed copy of the message. If the user chooses to receive a faxed copy, the process is handled as previously described.

Profile Manager

Figure 11:
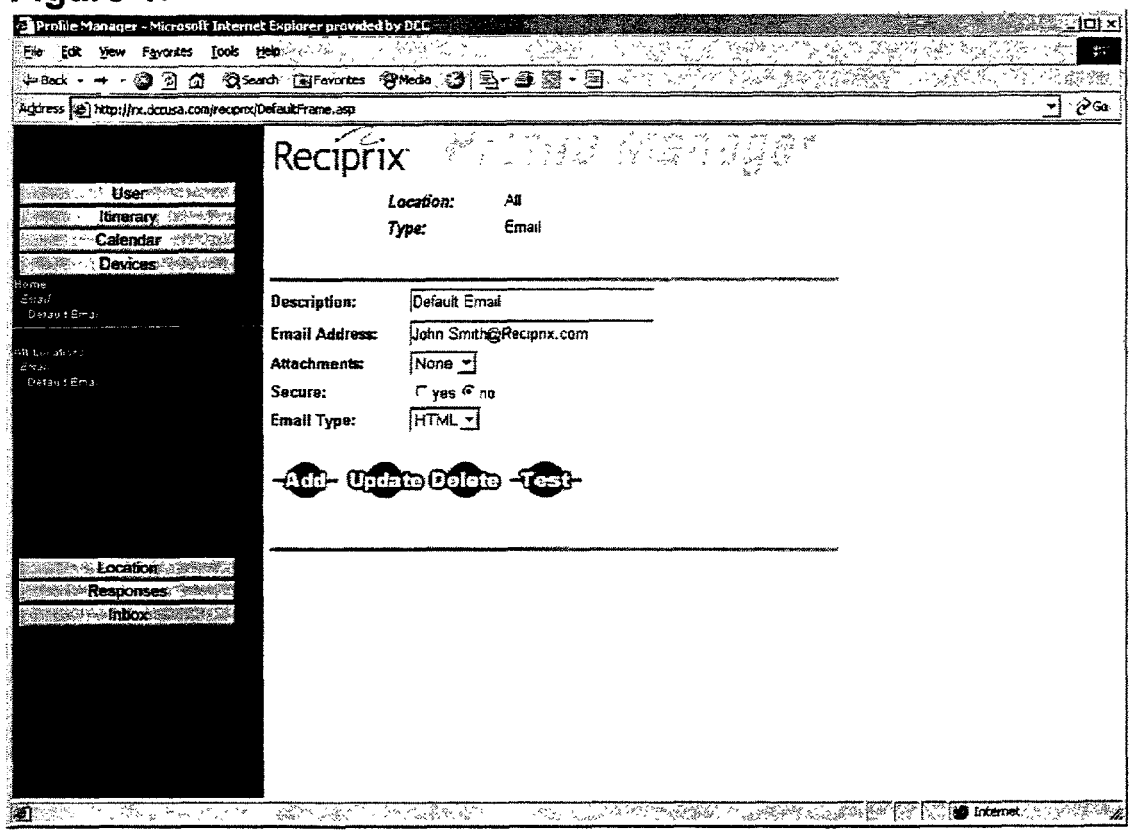
FIG. 11 is a screen shot graphic display of the Profiles dialogue box presented to a recipient when using the Profile Manager module as implemented in the system of FIG. 9.

FIG. 4 illustrates the basic functionality of the Profile Manager module 4 used for developing and maintaining recipient profiles according to the present invention. The user defines message delivery methods according to the device importance, device security and schedule. The user begins by logging into the system (4.01) where different profile management options are displayed (4.02). These options include user information (FIG. 14), itineraries/appointments (FIG. 13), location information (FIG. 11) and location device information (FIG. 12).

Figure 12:
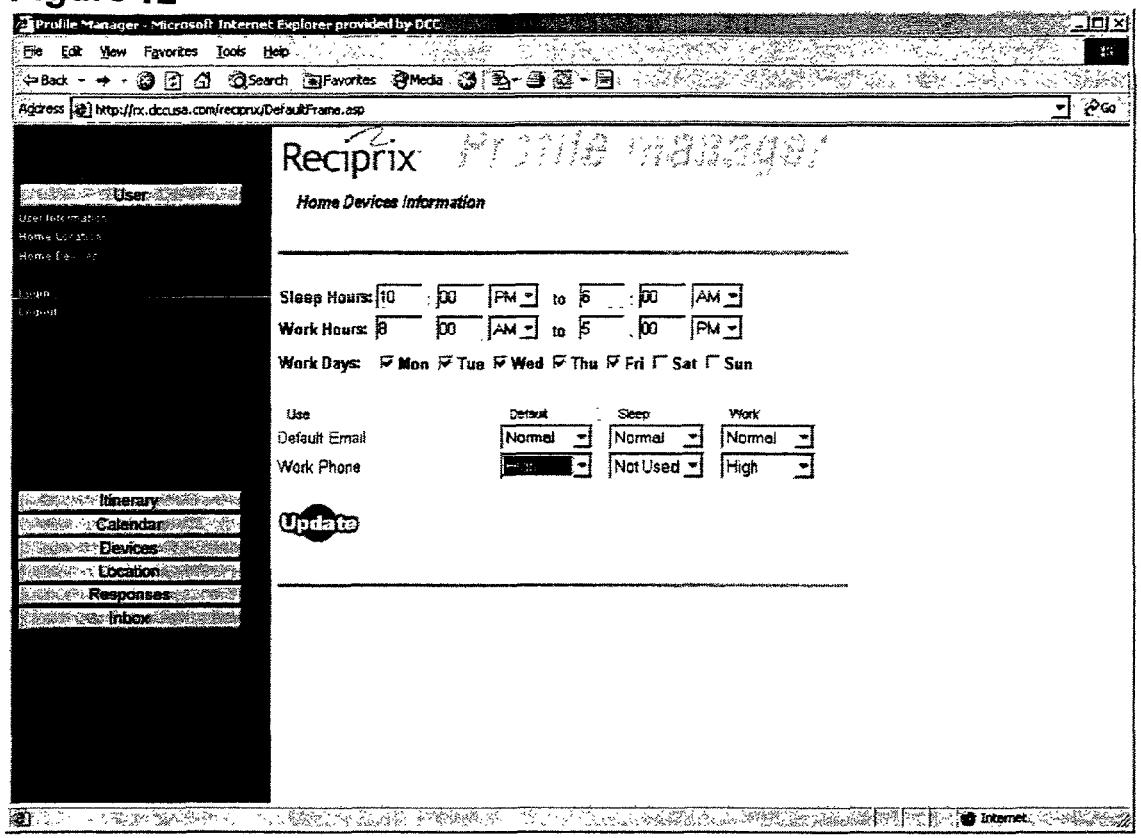
FIG. 12 is a screen shot graphic display of the Device Information page presented to a recipient-user when using the Profile Manager module as implemented in the system of FIG. 9.

Upon selecting user information (4.10), the user may modify basic profile information (4.11) such as name, login, PIN, and PIN reminder phrase, as well as home location (4.12) and home location device (4.13) information (FIG. 12). All user information is stored (4.14) to the System Database 8 (4.50).

Figure 13:
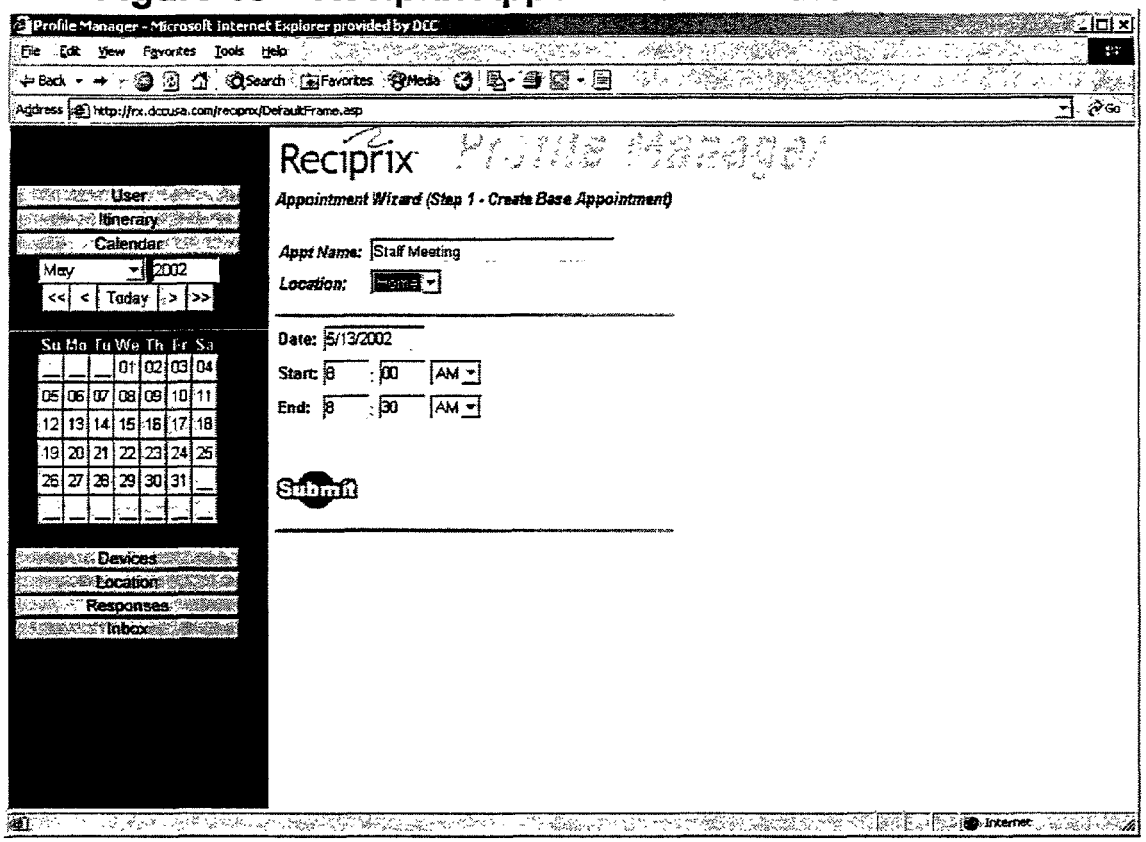
FIG. 13 is a screen shot graphic display of the Scheduling page presented to a recipient-user when using the Profile Manager module as implemented in the system of FIG. 9.
Figure 14:
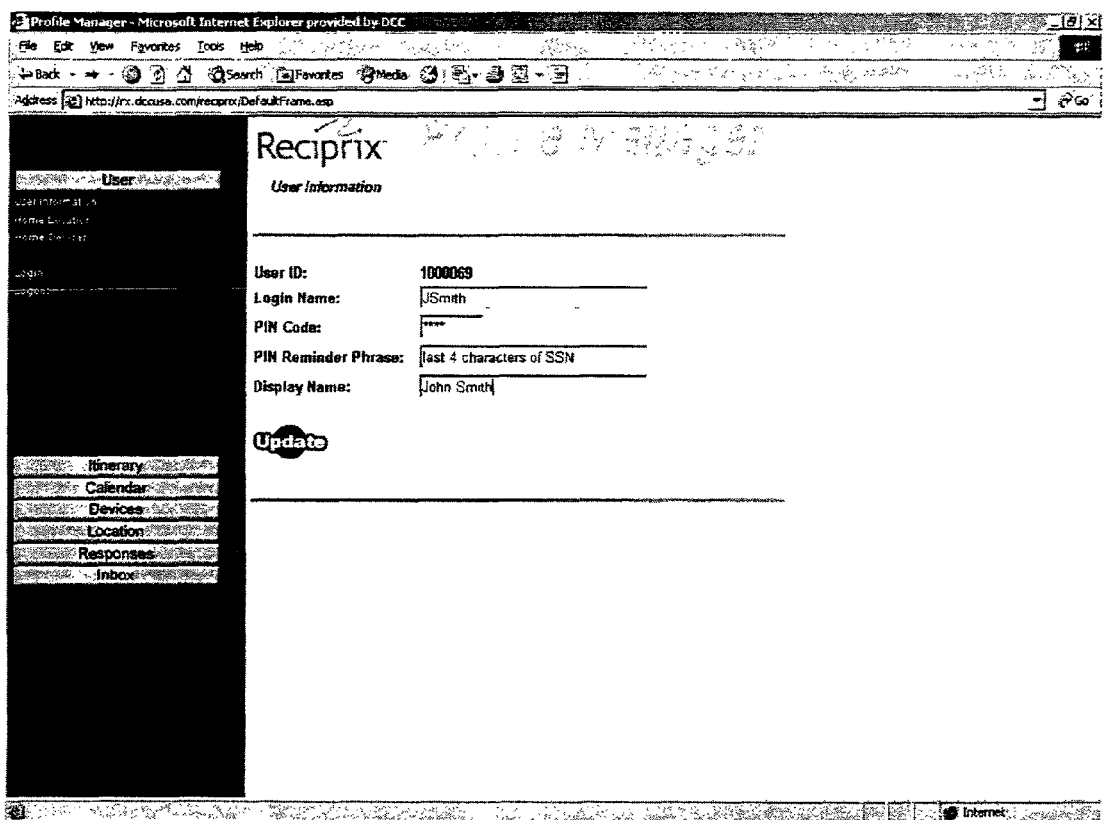
FIG. 14 is a screen shot graphic display of the User Information page presented to a recipient-user in the Profile Manager of the system of FIG. 9.
Figure 15:
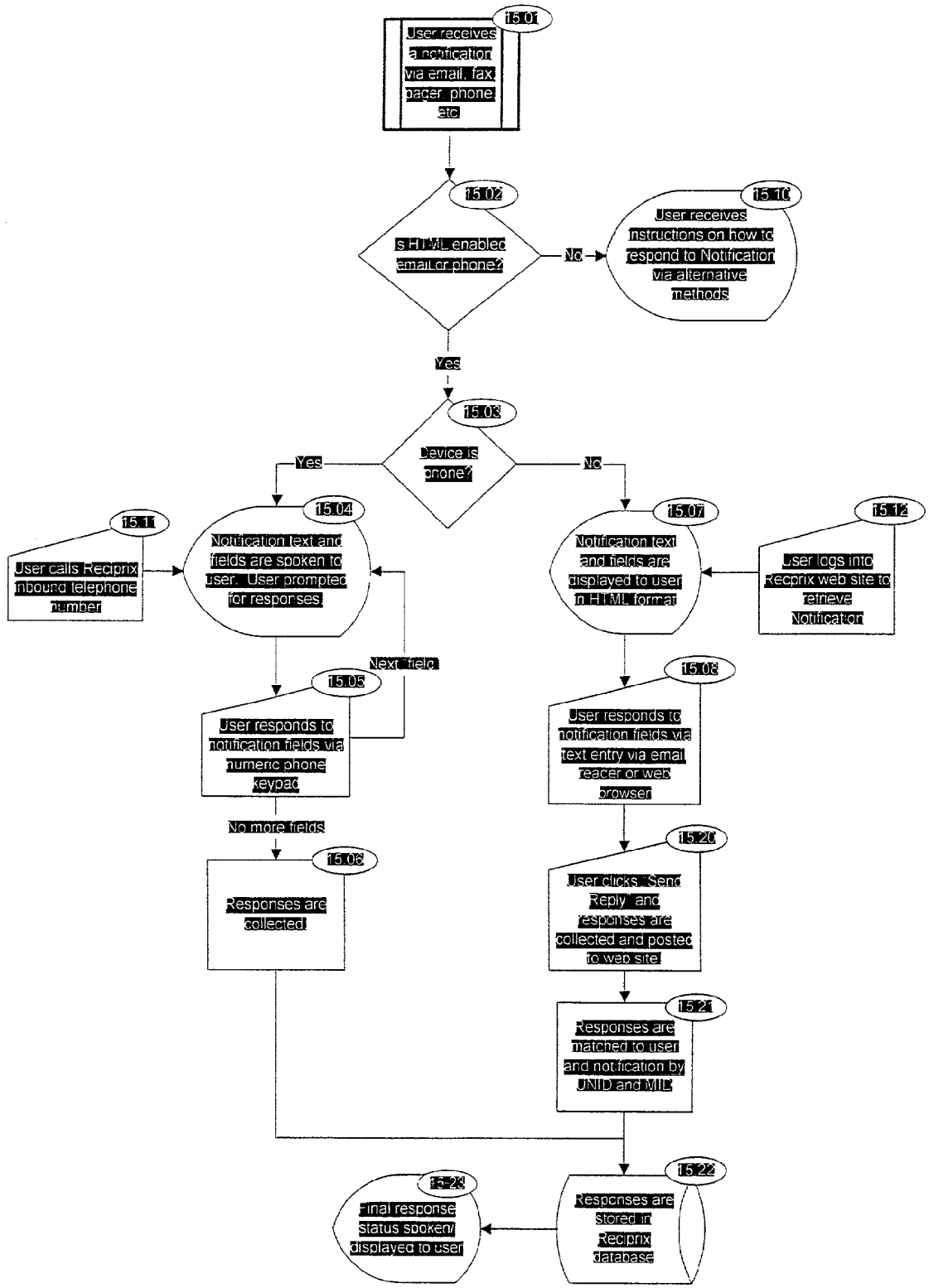
FIG. 15 is a block diagram overview of the flow of message and message response information in the Response Monitor module in the system of FIG. 9.

When selecting itineraries/appointments (4.20), the user may create (4.21), modify (4.22), and/or delete appointments (intra-day) and itineraries (multi-day) schedules (FIG. 13). Schedules are based on date, time and recurrence patterns (4.21). Each schedule is associated with an existing location (4.40) and previously defined devices (4.30) can also be associated with such schedules. All schedule changes are stored (4.23) to the Database 8 (4.50).

By choosing devices (4.30), the user can create (4.31), modify (4.32), and/or delete device definitions for receipt of message information sent by the system. These include email, voice mail, fax, pager, telephone and wireless communication devices according to the present invention, and can easily accommodate other delivery devices as well. The user can specify which devices are secure for personal, sensitive, confidential message receipt. All device changes are stored (4.33) to the Database 8 (4.50).

Selecting locations (4.40) allows the user to create (4.41), modify (4.42), and/or delete locations such as work, home, vacation, travel office, and travel accommodations. All location changes are stored (4.43) to the Database 8 (4.50).

Response Monitor

FIG. 6 depicts an overview of the flow of information from receipt of a message into the Response Monitor 6 for collecting and processing of response information according to the present invention. The recipient receives the message on the device(s) of choice (6.01). If the device is not receipt enabled (6.02), then the recipient is prompted (6.10) to respond via alternative methods (6.11, 6.12). If the device is voice enabled (6.03) then the response fields are spoken to the recipient (6.04); all responses are collected (6.05) and submitted to the Response Monitor 6 (6.20). If the device is not voice enabled, the response fields are displayed to the recipient (6.06) allowing entry; all responses are collected (6.07) and submitted to the Response Monitor 6 (6.20). As responses are submitted to the Response Monitor 6 (6.20) they are matched with the proper message (6.21) and stored in the System Database 8 (6.22). Feedback is provided to the recipient (6.23) on the status of the submitted responses.

Response Viewer

Figure 18:
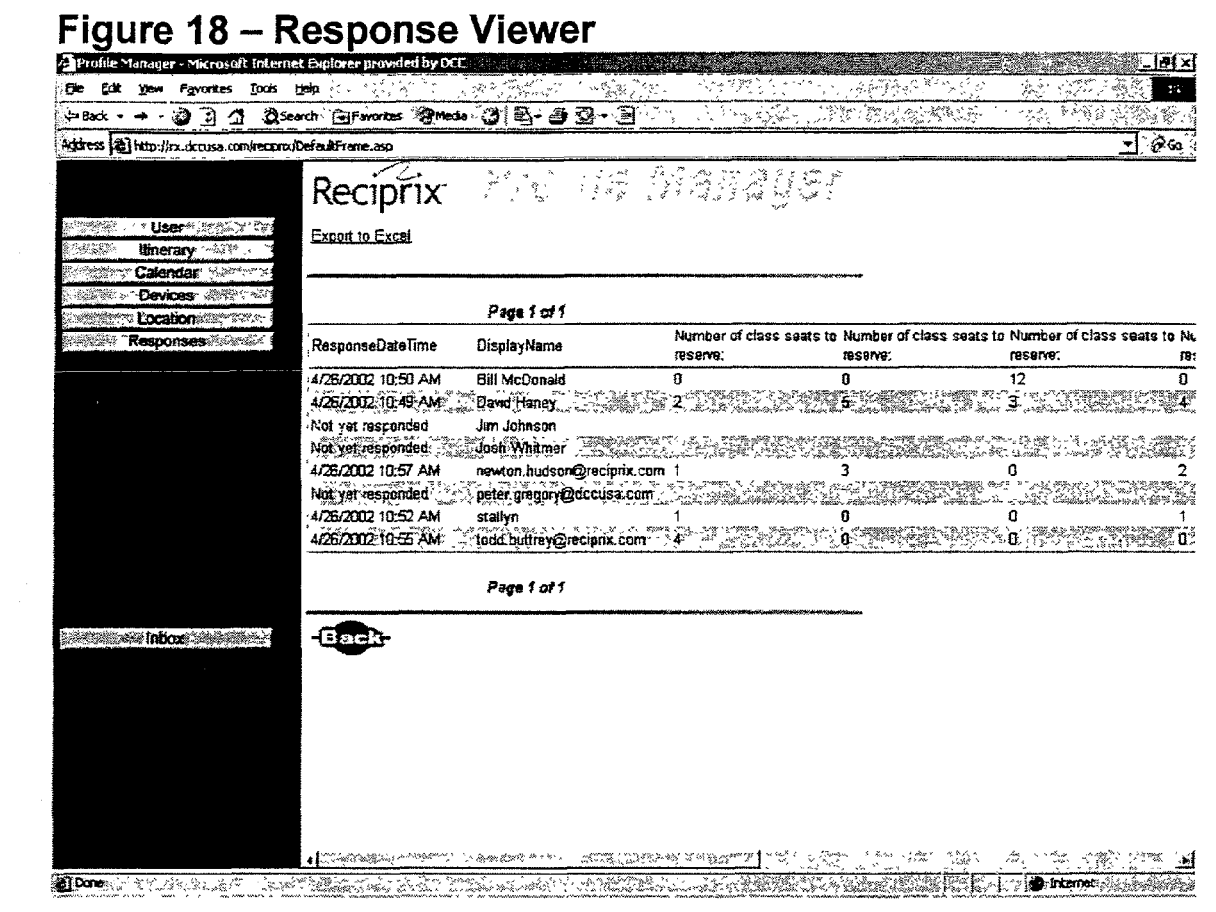

FIG. 7 shows the steps implemented in the Response Viewer module 7 for viewing information returned by recipients in response to messages according to the present invention. The user has access to all returned message information, verification of message, status of responses, and consolidation of recipient response information. The user begins by accessing the Response Viewer 7 (7.01) where a summary view of all messages sent by the user is displayed (7.02). A typical summary view of message responses is shown in FIG. 18. The user can view the responses for a specific message (7.10) or delete (7.20) specific message(s) and their related response collections. If the user chooses to view the collected responses for a message (7.10), detail response information gathered from each recipient who has submitted responses is displayed (7.11). The user may export this detail response information as well (7.30). For example, FIG. 5 shows message response information exported by the system to a spreadsheet. The user may choose to delete message(s) and their related response collections (7.20). Each message is marked (7.21) and when ready, all marked messages, along with all collected responses, can be deleted (7.22). Once a message is deleted, no more responses will be accepted from recipients in regards to that specific message.

System Database

FIG. 8 illustrates an example of the key data dictionary tables contained in the System Database 8 for processing messages, storing profiles and response field data. The System_Setting (8.01) and System_Value (8.02) tables store a variety of configuration data accessed by all elements of the System Server 9, with unlimited storage available for future data elements as needed. The Device Type (8.03) and Device-Type_Attribute (8.04) tables maintain meta-data providing descriptions of supported devices and rules for rendering and sending messages to each device type. Specifically, these are the device_rendering_handler and the device_sending_handler name components to be invoked by the system to create the rendered form of the message and to send the message to the destination devices. This architecture allows the system to be configured on-the-fly to support new devices as they become available without significant architectural changes through the simple addition of two new components.

Individual user information, including login and access privileges, are stored in the Recipients (8.05) table. User profile information, maintained through the Profile Manager 4 and accessed by Notify Resolver 9.05, is stored in several dependent tables. Schedule data is maintained in the Location (8.06), Trip 8.07 and Appointment (8.08) tables, while information describing an individual's devices is stored in the Device (8.09) and Device_Attribute (8.10) tables. Devices are assigned to schedules via the Appointment_Device (8.11) table.

Responses from each recipient are stored in the Responses (8.12) and ResponseValues (8.13) tables.

System Implementation

The system 10 of this invention can be implemented in a variety of messaging environments and computing platforms. For example, the system can be adapted to provide a high degree of integrated functionality in a computing platform that uses Microsoft Windows 98, NT, 2000, and XP as its operating system. The Messenger module 2 may be installed as a stand-alone application or it may also be installed with Microsoft Outlook 2000 and Outlook XP as an Outlook Add-in. In an Add-in embodiment, the Messenger 2 would be accessed as a toolbar extension in the Microsoft Office 2000 and XP environments. In a stand-alone embodiment, the application would be accessed from the programs folder.

Looking now at FIG. 2, the Messenger module 2 is the starting point for implementation of the system. The user chooses "Messenger" with a new message form on screen to begin the messaging process. The user/sender is presented with a message form as shown, for example, in FIG. 3. The user enters the subject (2.3) and body (2.31) of the message. The user has a choice of message sensitivity (2.33), importance (2.32), and recipients (2.11, 2.12) to associate with each message. The user can also attach documents (2.34) and response fields (2.20) to the message. After the user inputs all necessary fields, he/she can then choose to send the message. Upon sending the message, the Messenger 2 decomposes the message into a universal message format. The recipient list, the message properties, and the message are embedded in a command package. Once the command package is in place, the package is then posted via the Internet to the Server 9 for processing. When the Server 9 receives the message, an email message is sent to the user/sender stating what devices this message has been sent to.

Once the Server 9 receives the message, it stores the message into the System Database 8. When a message is saved, it is assigned a unique message ID. Once a unique identifier has been assigned, the message is then passed to the Notify Resolver component (9.05) (FIG. 9) for resolution of devices according to the rules the recipients have established for themselves. The Notify Resolver 9.05 will then route the message to the specific device renderer (9.07-9.10), as specified in the device_rendering_handler column of the Device Type (8.03) table of the Database 8, for rendering the message into a device compatible format. This is when an email is generated to the user/sender describing the devices to which the message has been sent. Each rendered form of the message is then sent to the device specific sender (9.11-9.14) as determined by the device_sending_handler column of the Device Type (8.03) table of the Database 8. Each sender submits a "call" request for each device to its corresponding gateway. For example, for delivery of email messages, an SMPT server is utilized via Microsoft's' Internet Information Server, while wireless, phone, fax, and pager device messages are sent to the appropriate component of the RxT Server 9.16 for processing.

Depending on gateway information, the Email sender (9.11) handles email routing and routing to gateways. The Outlook Global Address list (not shown) is where message recipients will be chosen from and all others will be in the form of standard Internet email addresses.

The Profile Manager 4 of this embodiment is shown in FIG. 4. This module allows the recipient to choose which devices he/she will be contacted by and at what times and security levels these devices shall be accessed. The data for this profile will reside on the System Database 8. The recipient profiles can be accessed and modified either directly, from the Internet web, or via an Application Program Interface.

As seen in FIG. 4, a recipient sets up his or her recipient profile by making selections from three primary categories: devices, profiles, and schedules. As seen in FIG. 4, a recipient first selects the "devices" tab and chooses one or more messaging devices that are to be used for delivering messages to that recipient. A check box indicates whether or not that selected device is capable of receiving secure messages. Information about that device, e.g., a phone number for a work phone, is entered. The recipient then selects the "profile" tab so that profile details corresponding to each selected messaging device can be entered (FIG. 12). For example, the recipient will determine whether a particular messaging device is to be used for secure messages or not and which messaging devices will correspond to the three levels of message importance. Finally, the recipient selects the "schedules" tab so that the recipient can assign the various profiles to dates and times. For example, at certain times of the day or on certain days of the week, the recipient may wish to receive messages of normal importance at work only. However, if the message is of high importance, then that recipient may wish to receive the message at home or at work.

The recipients may respond to messages by e-mail, by conventional interactive voice response using a telephone and touch-tone keypad, or by entering response information on a response page corresponding to a specific message and automatically posted on the Internet by the system.

Figure 16:
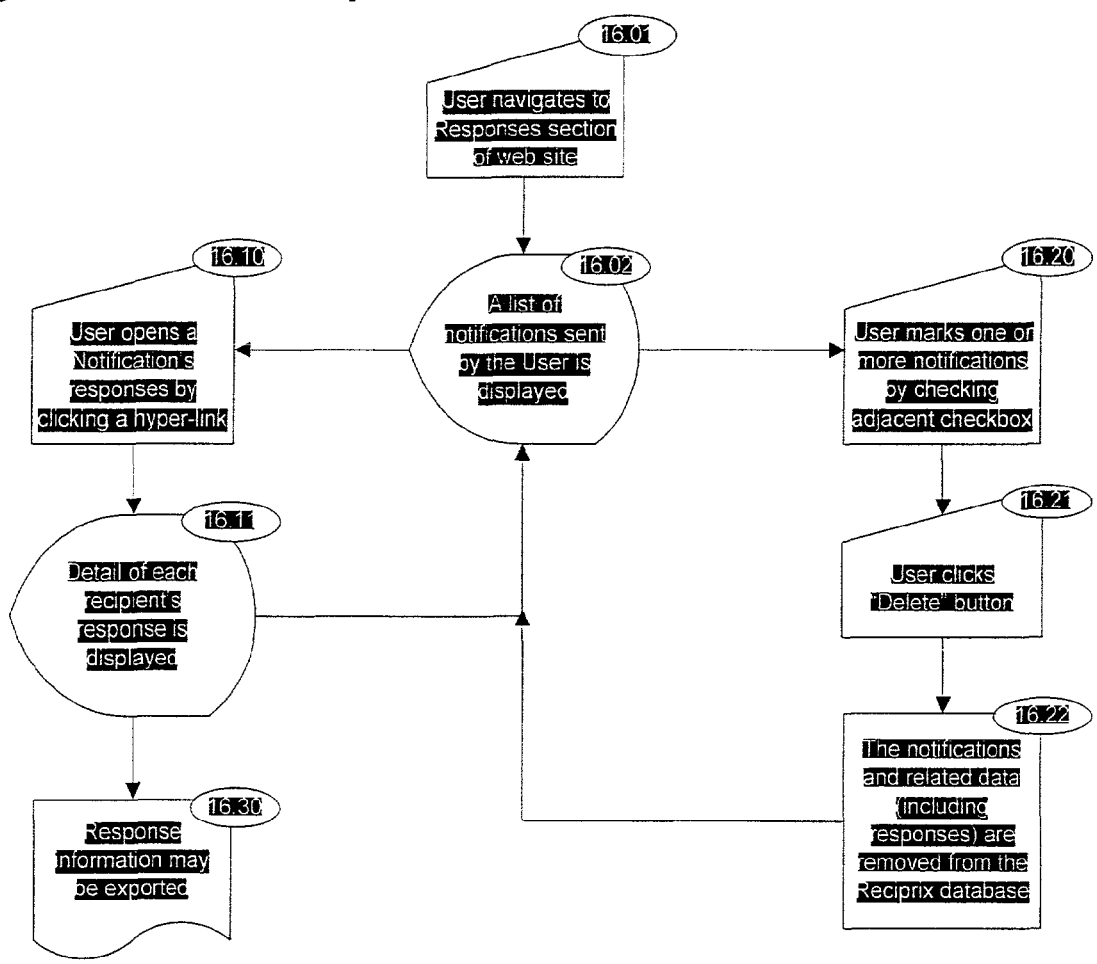
FIG. 16 is a flow chart of illustrating the steps associated with use of the Response Viewer module of the system of FIG. 9.

There are two methods of responding to a message. The first method is done via an Internet post from e-mail or web based e-mail application. This process is shown in FIG. 16. The second method to respond to a message is via an Interactive Voice Response application.

All responses are stored in the System Database 8. They are crossed referenced by message ID, recipient ID, and field ID for retrieval and data manipulation by the sender. Recipients are not limited to the number of times they can respond to a specific message unless specific constraints have been placed upon said message.

The Database 8 is the repository for profile information. Preferably, the Database 8 will reside on the same computer that supports the Server 9 although it could be located in a separate sub-system. The Database 8 is also the repository of information about the fields for a response and setup information.

The Response Viewer 7 of the Internet embodiment is shown in FIG. 7. It allows the user to see information about the responses that have been received. The user can see the messages with the fields as in the normal viewing of the Web application. In addition, a separate program file that contains the responses in a formatted fashion can be exported to a variety of different programs, such as a Microsoft Excel spreadsheet as shown in FIG. 5. As shown on FIG. 18, the response information organized and displayed can include the identification of the recipients, status and time of message delivery, substance of the response, identification of the messaging device(s) used to deliver the message, time of response, etc.

The Database 8 in this embodiment can be organized generally as shown in FIG. 8, using the following table and field definitions.

Tables:

| System_Settings | |
|---|---|
| settingID | numeric |
| setting_name | up to 128 characters |
| device_type_code | numeric |
| setting_datatype | up to 20 characters |

| System_Value | |
|---|---|
| settingID | numeric |
| system_value | up to 1,073,741,823 characters |

| Device_Type | |
|---|---|
| device_type_code | numeric |
| device_type_desc | up to 100 characters |
| device_rendering_handler | up to 1024 characters |
| device_sending_handler | up to 1024 characters |
| device_enabled | Boolean |

| Device_Type_Attribute | |
|---|---|
| device_attributeID | numeric |
| device_type_code | numeric |
| attribute_name | up to 128 characters |
| attribute_validation_object | up to 255 characters |

| Recipients | |
|---|---|
| UNID | numeric |
| recipient_GUID | unique identifier |
| loginName | up to 128 characters |
| displayName | up to 128 characters |
| exchangeName | up to 128 characters |
| PIN | 4 characters |
| PINReminderPhrase | up to 50 characters |
| pword | up to 128 characters |
| pwordReminderPhrase | up to 50 characters |
| failedLogins | numeric |
| spokenName | large binary data |
| is_temporaryUser | Boolean |
| canCreateDL | Boolean |
| lastLoggedOn | datetime |
| external_account | up to 20 characters |

| Location | |
|---|---|
| locationID | numeric |
| location_GUID | unique identifier |
| location_name | up to 80 characters |
| UNID | numeric |
| is_home | Boolean |
| timezoneID | integer |

| Trip | |
|---|---|
| tripID | numeric |
| trip_GUID | unique identifier |
| trip_name | up to 80 characters |
| UNID | numeric |
| locationID | numeric |
| begin_datetime | datetime |
| end_datetime | datetime |
| no_defaults | Boolean |

| Appointments | |
|---|---|
| appointmentID | numeric |
| appointmentGUID | unique identifier |
| appointment_name | up to 255 characters |
| tripID | numeric |
| begin_datetime | datetime |
| duration | numeric |

| Device | |
|---|---|
| deviceID | numeric |
| device_GUID | unique identifier |
| device_type_code | numeric |
| UNID | numeric |
| is_Portable | Boolean |

-continued

| Device | |
|---|---|
| deviceID | numeric |
| device_attributeID | numeric |
| device_attribute_value | up to 255 characters |
| Appointment_Device | |
| deviceID | numeric |
| appointmentID | numeric |

When implemented as shown above, selecting "Messenger" in Outlook or from the desktop starts the loop with messaging and message modes. Messages can be sent in low, normal or high importance modes. The System Client 5 makes faxing, paging and voice communications from email easy to use by shielding the user from the details of each recipient's devices and work schedule. As seen on FIG. 3, the user is presented with a standard universal message form. He/she then selects recipients from the global address list, adds fields if desired, fills out the message form, and sends the message. The system responds by creating a return message to the sender that advises him of the quantity and type of devices to which this message will be delivered as identified in the profiles of the message's recipients. Ad-hoc additions to the global address list and associated messaging device information are available for real-time profile additions by the user. Once the message is sent, the Server 9 provides text-to-speech conversion and voice mail navigation for phone and voice mail recipients, and manages message delivery for all messaging devices. The Messenger 2 can also provide a "response field" option 2.20 (FIGS. 2 and 3) for defining additional information the sender may require from the recipient for report generation or other business processes. The Messenger 2 user merely chooses the fields of information applicable and drops them in the message (2.20) for presentation to the recipient. Results are tabulated for review in the Response Monitor 6, as shown in FIGS. 5 and 18.

Once messages are sent, the Response Monitor 6 closes the loop with immediate verification of receipt and responses. The user selects "system web", signs in, and clicks on the specific message for monitoring, and response information and details for each message are presented. All messaging devices used for contact are indicated for each recipient as well as time of status confirmation. If the response field feature was used, then captured information is also presented to the user in a pre-defined format for processing.

Receipt of a system message is formatted for specific devices (i.e. e-mail, pager, fax, phone) defined in a recipient's profile. Text-to-speech is provided for phone receipt, and voice mail navigation is accomplished through the RxT Server software. Any recipients of system messages that are not profiled will receive e-mail by default, with a reminder to set up their profile to take full advantage of the communications, scheduling and priority extensions to enhance their business productivity. A recipient may respond to the system message through the most convenient device available to him at the time and is prompted to supply information requested by the sender for proactive closure. The recipient's response back to the sender can be initiated by e-mail; phone or Web activated devices.

Licensed users of Client 5 are registered through an administration console (not shown). Clients 5 can be added and deleted up to the license limitations using email address identifications. Client licenses can be purchased for additional users. Only senders must be licensed, as recipients can establish profiles and respond without a Client software license.

The administration console also manages messaging priority limitations for all registered Client users. Client users can set low/normal/high priority limitations in their profiles for any and all other registered Client users, or the system manager may set limitations in accordance with corporate policies.

The administration console provides management of system defaults, Web page profile and response configurations, and activity reports such as traffic, transmission and errors. The system manager can look at system usage, peak loads, device driver utilization, task identifications and other functions to determine when and where maintenance or software and hardware expansions are required. Data mining of Database 8 is accomplished from the administration console or from a third-party interface developed via the System Applications Programming Interface.

Client 5 and Server 9 software modules are initially installed using the Install Shield Service. This is a quick and easy process administered by the system manager. The administration console is then accessible from the system manager's designated desktop. The Messenger 2 resides on a LAN with Internet access in conjunction with the Server 9 components and the System Database 8 (Microsoft SQL 2000, for example).

The 3-tier architecture of this embodiment of the system is fully scalable from small office to enterprise environments. The Client 5 can be integrated with email software like Outlook 2000 for full compatibility with Office 2000 users. For medium and large customers where traffic and channel density increases, the Client 5 and Server 9 exploit Microsoft .NET multi-threaded architecture, and SQL Server 2000. SQL servers provide communications and database standards for full CTI compatibility. Supported standards include MAPI, TAPI, X.400, AMIS, TAP, and PET.

The routines and steps described above are easily implemented using standard programming tools, libraries and techniques, such as Visual Basic, and Microsoft Windows Speech Applications Programming Interface (SAPI). A number of conventional messaging device servers and interfaces can be used with the system, including: Fax SR from OmTool, Harmony from OpenPort Technologies, or RightFax from Applied VoiceTechnology for fax services; and Mobile Connector from Fenestrae, or TAP interface (alternatively known as PET or IXO) as defined by Personal Communications Industry Association for pager services. Interactive voice server technology, including a voice server, text to speech library, and voice mail navigation system is available from Dialogic Communications Corporation, Franklin, Tenn.

Thus, although there have been described particular embodiments of the present invention of a new and useful Automated System and Method for Delivery of Messages and Processing of Message Responses, it is not intended that such references be construed as limitations upon the scope of this invention except as set forth in the following claims.

What is claimed is:

1. A method of delivering a sender-created message to one or more recipients using at least one messaging device, the method comprising:

creating message content and message information for the message in a universal message form using a message client, wherein the universal message form comprises a header and a body, the header including the message information comprising data identifying the one or more recipients of the message, and the body including the message content and wherein the body is initially devoid of any fields;

embedding at least one sender-defined response field in the body, the response field adapted to directly accept message responses in a recipient-created format that is independent of sender-defined parameters in the sender-created message;

automatically accessing recipient profiles stored in a database, the recipient profiles created by the one or more recipients, the recipient profiles comprising data indicative of a recipient's location and schedule, the recipient profiles further comprising data indicative of one or more types of messaging devices available for receiving the message based upon a current time and the data indicative of the recipient's location and schedule;

translating in a message server the message content and the universal message form into a message format usable by each of the one or more types of messaging devices selected by the recipient in the recipient profile; and transmitting the message and the universal message form to each of the one or more types of messaging devices selected by the recipient;

wherein translating into the message format is based at least on a message sensitivity level.

2. The method of claim 1, further comprising:

receiving in the message server responses to the message entered by the recipients in the response field in the universal message form using the one or more types of messaging devices;

automatically linking the responses to the message to the message information created in the message client; and viewing the response to the message on the message client.

3. The method of claim 2, further comprising:

identifying multiple recipients for the message in the message information;

accessing multiple recipient profiles in the database corresponding to the multiple recipients identified in the message information;

transmitting the message and the universal message form to each messaging device selected by the multiple recipients;

receiving in the message server responses to the message entered by each of the multiple recipients in the response field in the universal message form using the messaging devices;

automatically linking the responses to the message to the message information created on the message client;

storing the responses to the message in the database; and organizing the responses to the message for viewing on the message client.

4. The method of claim 3 wherein the types of messaging devices include pagers, e-mail readers, telephones, personal computers, fax machines and voice mail systems.

5. The method of claim 4 wherein the type of messaging device used by the multiple recipients to send the response to the message is different from the type of messaging device used to deliver the message to the multiple recipients.

6. The method of claim 1 further comprising:

identifying multiple recipients for the message in the message information;

accessing multiple recipient profiles in the database corresponding to the multiple recipients identified in the message information;

translating in the message server the message content and the universal message form into multiple formats corresponding to multiple types of messaging devices identified by the multiple recipients in the multiple recipient profiles; and transmitting the message and the universal message form to each of the multiple types of messaging devices selected by the multiple recipients.

7. The method of claim 6 wherein the types of messaging devices include pagers, e-mail readers, telephones, personal computers, fax machines and voice mail systems.

8. The method of claim 1, further comprising embedding hidden information in the message, the hidden information uniquely identifying both the message and at least one of the one or more recipients, wherein the hidden information enables the message server to distinguish which of the one or more recipients has responded to the message.

9. A method of delivering a sender-created message to one or more recipients using at least one messaging device, the method comprising:

creating message content and message information for the message in a universal message form using a message client, wherein the universal message form comprises a header and a body, the header including the message information comprising data identifying the one or more recipients of the message, and the body including the message content and wherein the body is initially devoid of any fields;

embedding at least one sender-defined response field in the body, the response field adapted to directly accept message responses in a recipient-created format that is independent of sender-defined parameters in the sender-created message;

automatically accessing recipient profiles stored in a database, the recipient profiles created by the one or more recipients, the recipient profiles comprising data indicative of a recipient's location or schedule, the recipient profiles further comprising data indicative of one or more types of messaging devices available for receiving the message based upon a current time and the data indicative of the recipient's location or schedule;

translating in a message server the message content and the universal message form into a message format usable by each of the one or more types of messaging devices selected by the recipient in the recipient profile; and transmitting the message and the universal message form to each of the one or more types of messaging devices selected by the recipient;

wherein translating into the message format is based at least on a message sensitivity level.

* * * * *

UNITED STATES PATENT AND TRADEMARK OFFICE
CERTIFICATE OF CORRECTION

| | |
|---|---|
| PATENT NO. | : 7,966,373 B1 |
| APPLICATION NO. | : 10/155836 |
| DATED | : June 21, 2011 |
| INVENTOR(S) | : Charles M. Smith and Harold D. St. Clair |

Page 1 of 1

It is certified that error appears in the above-identified patent and that said Letters Patent is hereby corrected as shown below:

At column 7, line 56, change "interne" to --internet--.

At column 15, line 26-27, in Claim 2, change "to the message to the message" to --to the message--.

At column 15, line 42-43, in Claim 3, change "to the message to the message" to --to the message--.

Signed and Sealed this
Eighteenth Day of September, 2012

David J. Kappos
*Director of the United States Patent and Trademark Office*